United States Patent [19]
Havens et al.

[11] Patent Number: 5,973,865
[45] Date of Patent: Oct. 26, 1999

[54] OPHTHALMIC FILTER MATERIALS

[75] Inventors: Thomas G. Havens, Painted Post; David J. Kerko; Brent M. Wedding, both of Corning, all of N.Y.

[73] Assignee: Corning Incorporated, Corning, N.Y.

[21] Appl. No.: 09/155,631

[22] PCT Filed: Apr. 21, 1997

[86] PCT No.: PCT/US97/06923

§ 371 Date: Sep. 29, 1998

§ 102(e) Date: Sep. 29, 1998

[87] PCT Pub. No.: WO97/41467

PCT Pub. Date: Nov. 6, 1997

Related U.S. Application Data

[60] Provisional application No. 60/016,475, Apr. 29, 1996.

[51] Int. Cl.⁶ .............. G02B 5/22; G02C 7/10; G02C 7/06; C03B 11/08
[52] U.S. Cl. .............. 359/885; 351/163; 351/177; 65/37
[58] Field of Search .............. 359/885; 351/189, 351/163, 165; 65/37; 428/334; 427/160

[56] References Cited

U.S. PATENT DOCUMENTS

| | | | |
|---|---|---|---|
| 4,284,686 | 8/1981 | Wedding | 428/334 |
| 4,454,170 | 6/1984 | Gogpfert et al. | 427/160 |
| 5,381,193 | 1/1995 | Wedding | 351/163 |

*Primary Examiner*—Cassandra Spyrou
*Assistant Examiner*—Audrey Chang
*Attorney, Agent, or Firm*—Milton M. Peterson

[57] ABSTRACT

An ophthalmic filter material having a photopic transmittance ($Y_P$) higher than the scotopic transmittance ($Y_S$), the ratio of $Y_P$:$Y_S$ being in the range of 2.0–4.0, a dominant wavelength within the ranges of 580–605 nm and a color purity of 60–75% whereby colors perceived through the material approximate those of the scene being viewed. A method of producing such a filter material which comprises heating a photochromic glass lens in a reducing atmosphere for a time and at a temperature that is sufficient to impart the recited characteristics to the glass surface and that is equivalent to a flowing hydrogen atmosphere, or immersing a tintable plastic solution in a dye solution for a time sufficient to impart the recited characteristics.

17 Claims, 4 Drawing Sheets

OPHTHALMIC FILTER MATERIALS

This application claims the benefit of U.S. Provisional Application No. 60/016,475, now abandoned express mailed Apr. 4, 1996, entitled Protective Filter Lenses, by Thomas G. Havens, David J. Kerko and Brent M. Wedding also is a 371 Application of PCT/US97/06923 filed Apr. 21, 1997.

FIELD OF THE INVENTION

The field is ophthalmic filter materials, in particular, lenses designed to protect the eye from the effects of strong sunlight.

BACKGROUND OF THE INVENTION

The present invention relates to ophthalmic filter materials. These materials selectively transmit radiation in the visual and near-visual regions of the spectrum. The present materials are primarily concerned with controlled transmission of sunlight through ophthalmic lenses.

The invention was developed employing photochromic glass lenses. However, for some purposes, photochromic glass is not suitable because of safety and/or weight. Fortunately, the invention is also applicable to tintable plastic materials as well. The invention may also find application in products other than glass and plastic, ophthalmic lenses, such as visors and shields.

The invention was developed using photochromic glass lenses, and is largely so described. However, as indicated, the invention is not so limited, and may also be practiced employing tintable plastic materials. Accordingly, that practice is also described.

All of the commercially important photochromic glasses contain a precipitated, microcrystalline, silver halide phase. It is this phase which is considered to cause the reversible darkening of the glass under exposure to light. U.S. Pat. No. 3,208,860 (Armistead et al.) provides the basic description of this family of glasses.

The patent is drawn generally to silicate-based glasses. The preferred compositions are encompassed within the alkali metal oxide-$Al_2O_3$—$B_2O_3$—$SiO_2$ system. Thus, the preferred base compositions consist essentially, expressed in weight percent on the oxide basis, of about 4–26% $Al_2O_3$, 4–26% $B_2O_3$, and 40–76% $SiO_2$, wherein $R_2O$ is selected from the group of 2–8% $Li_2O$, 4–15% $Na_2O$, 6–20% $K_2O$, 8–25% $Rb_2O$, and 10–30% $Cs_2O$, the sum of the base glass ingredients constituting at least 85% of the total composition. The patent further observes the advantage of including small quantities of low temperature reducing agents, such as SnO, FeO, CuO, $As_2O_3$, and $Sb_2O_3$, to improve the photochromic characteristics of the glass. In order to impart preferred photochromic behavior to the glass, a silver halide is present in the glass.

Subsequent work has resulted in the development of a number of specific families of photochromic glasses exhibiting faster darkening and/or fading response. U.S. Pat. No. 4,190,451 (Hares et al.), for example, provides a description of more recently developed photochromic glasses of this type. The glasses described in that patent consist essentially, in weight percent, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ ranges about 0.55–0.85, and the weight ratio Ag:(Cl+Br) ranges about 0.65–0.95. The glasses may also contain up to about 10% total of optional constituents, expressly referring to 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$ and 0–2% F. Also, up to 1% total of transition metal oxide colorants and/or up to 5% total of rare earth metal oxide colorants can be included without adversely affecting the photochromic behavior of the glass.

U.S. Pat. No. 4,284,686 (Wedding) explains in some detail that certain diseases of the eye and/or visual deficiencies may be caused by, or may be aggravated by, strong sunlight. The patent notes that radiation at the short end of the visible spectrum, that is, at wavelengths on the order of 400–550 nanometers (nm), seems to create the greatest problems for some patients.

The patent observes that the eye contains two different kinds of photoreceptors, viz., cones and rods. The cones comprise the principal receptors in daylight vision (photopic vision); the rods constitute the principal receptors in night vision (scotopic vision).

The cones are located generally in the central portion of the retina, and are much greater in number/unit area. They permit the recognition of fine detail, presumably because they function largely independently of one another. The cones also permit color vision, i.e., they allow hues and saturation to be distinguished. In the presence of bright light, the eye is most sensitive to radiation at about 555 nm.

In general, the rods are located in the peripheral portions of the retina, there being few, if any, rods found in the central retina. The rods do not permit the recognition of colors, only shades of gray. Their peak wavelength sensitivity is near 510 nm.

As a corrective measure, the Wedding patent provides photochromic glasses that are treated to produce a colored surface layer. The colored surface layer exhibits near-zero transmittance of radiations having wavelengths shorter than a selected cutoff wavelength in the range 440–550 nm. The photochromic feature permits the same spectacles to be used both indoors and outside. To develop the colored layer, the photochromic glass is heated in a strongly reducing atmosphere, such as hydrogen. The exposure is at temperatures in the range of 350–520° C. for at least 12 hours.

Commercial glass lenses, developed on the basis of the patent teaching, have proven very useful for patients having relatively strong sensitivity to sunlight. However, the lenses generally have a yellow to orange color. From a cosmetic standpoint, this is regarded by many potential users to be quite unattractive.

Dye-impregnated plastic lenses have been developed as alternatives. The latter are sometimes referred to as "blockers", since they are stated to absorb all of the light below a certain wavelength. A major problem with the "blocker" lens is that total absorption of part of the spectrum greatly distorts color perception. This may also occur in the surface colored glass lens to some extent.

U.S. Pat. No. 5,381,193 (Wedding) describes an ophthalmic, protective filter lens having a scotopic transmittance ($Y_S$) lower than the photopic transmittance ($Y_P$) by more than a factor of two. The filter lens has a dominant wavelength within the range of 580–605 nm and a color purity in the range of 75–85%. Thereby, colors perceived through the lens are somewhat distorted from those of the scene being viewed. In an embodiment, a lens is composed of a photochromic glass having a coloration developed in at least one surface.

Ophthalmic lenses were developed on the basis of the patent teaching to cope with nocturnal vision problems. The lenses were designed to facilitate recovery of nocturnal vision after prolonged exposure to intense sunlight such as encountered in a desert.

Subsequently, the lenses were tested for use by persons beginning to experience a high sensitivity to bright sunlight under normal conditions. Criticism was encountered because the preferred embodiment for nocturnal vision exhibited an olive-green cast in the faded state. While the lenses of the -193 patent were designed to provide improved natural color perception relative to the lenses of the -686 patent, a desire for even less color distortion was expressed.

It is a basic purpose of the instant invention to provide an ophthalmic filter lens that meets these criticisms. A particular purpose is to provide a photochromic filter lens designed for outdoor use. Another purpose is to provide such a filter lens having an improved cosmetic aesthetic appeal. A further purpose is to provide a filter lens that combines specific features of protective lenses developed in accordance with the teachings of the Wedding -686 patent. Another purpose is to provide the filter benefits of the invention in a progressive lens.

SUMMARY OF THE INVENTION

One aspect of our invention resides in an ophthalmic protective filter material having a photopic transmittance ($Y_P$) greater than the scotopic transmittance ($Y_S$), the ratio of $Y_P:Y_S$ being in the range of 2.0–4.0, a dominant wavelength within the ranges of 580–605 nm and a color purity of 60–75%, whereby colors perceived through the material approximate those of the scene being viewed.

A further aspect resides in methods of producing the filter material of claim 1, in particular, a method that comprises heating a photochromic glass lens in a reducing atmosphere for a time and at a temperature that is sufficient to impart the recited characteristics to the glass surface and that is equivalent to a flowing hydrogen atmosphere.

PRIOR ART

The United States patents noted above are believed to represent the most pertinent prior art.

BRIEF DESCRIPTION OF THE DRAWINGS

In the accompanying drawings.

DESCRIPTION OF THE INVENTION

Figure 1:
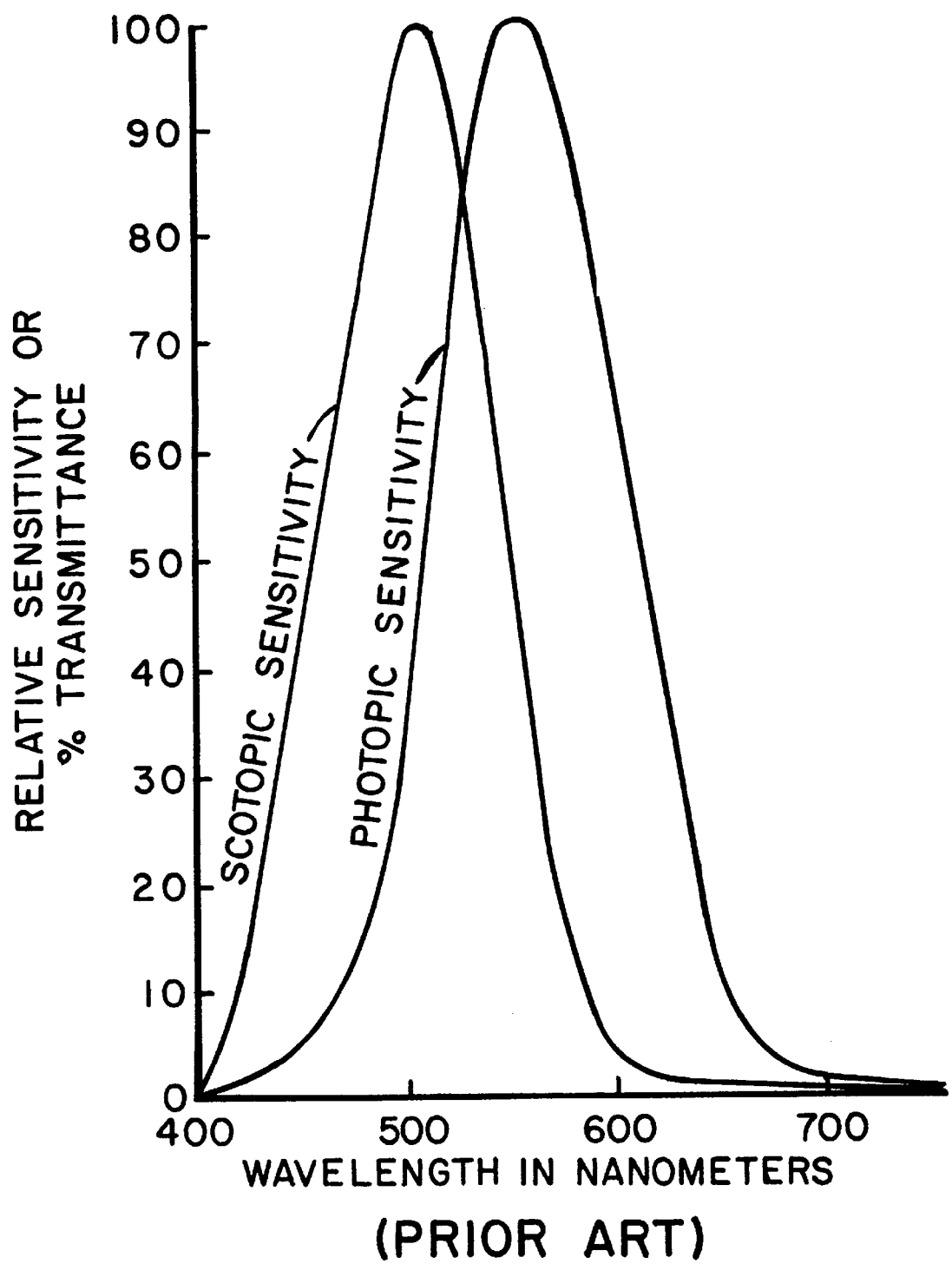
FIG. 1 is a graphical representation of the relative wavelength response for photopic and scotopic vision.

The present invention is essentially a modification of the ophthalmic product described in the Wedding -193 patent. That product is primarily designed to facilitate recovery of nocturnal vision. In particular, the present product is designed to adopt the desirable features of the nocturnal vision product, while meeting the cosmetic and color perception criticisms of that product.

The present invention may also be considered in terms of an ophthalmic medical product, such as that disclosed in the Wedding -686 patent. Thus, the present invention provides a filter lens for use outdoors by people having a mild, or beginning, sensitivity to the glare of bright sunlight. It embodies certain features of commercial glasses based on the -686 patent, while markedly improving on the undesirable color of those glasses.

Accordingly, the disclosure of each of the Wedding patents is incorporated herein in its entirety by reference.

Three commercial lenses were developed on the basis of the -686 patent. These are identified as CPF® 511, 527 and 550 lenses. The numbers refer to the wavelengths below which the glass has a strong spectral attenuation. Thus, a glass lens, identified by the number 511, has, in the undarkened state, very little transmission at wavelengths below 511 nm, and rapidly increasing transmission at longer wavelengths.

TABLE I below sets forth characteristic data for five lens products. In addition to the three commercial lenses described above, data for two additional lenses are included. One of these is an extra dark version of the 550 lens; the other is a glass lens in accordance with the present invention. This lens is identified by the designation G.

In TABLE I, transmittance data for fully faded, 2 mm thick lenses are presented. The characteristic photopic ($Y_P$) and scotopic ($Y_S$) values, and their ratio ($Y_P:Y_S$), are indicated under those headings.

TABLE I

| Product | $Y_p$ | $Y_s$ | $Y_p:Y_s$ |
| --- | --- | --- | --- |
| 511 | 44.5 | 12.2 | 3.6 |
| 527 | 32.4 | 6.1 | 5.3 |
| 550 | 19.6 | 2.2 | 8.9 |
| 550-XD | 8.8 | 1.1 | 8.0 |
| G | 17.8 | 6.2 | 2.9 |

It will be observed that the photopic transmittance of the present lens (G) is similar to that of the 550 lens. However, the color of the lens is a mahogany tint, rather than the bright orange of the 550 lens. This has proven much more acceptable cosmetically.

The scotopic transmittance of the G lens is similar to that of the 527 lens, a lens frequently selected by patients having significant glare sensitivity. However, the transmittance values of the 527 lens are significantly higher, as is the $Y_P:Y_S$ ratio of 5.3. Also, the color of the 527 lens, while considered preferable to that of the 550 lens by many, is still objectionable to others.

The 511 lens has a relatively low $Y_P:Y_S$ ratio. In addition, the transmittance values are much higher than desired for the intended use of the present inventive lenses.

It is apparent that the G lens brings together a number of individually desirable features of prior protective lenses. It brings these features together in a protective lens that is much more acceptable cosmetically. The new lens is primarily designed for patients who require a dark lens for outdoor use.

A critical feature of the present inventive material is the ratio of photopic-scotopic transmittance values ($Y_P:Y_S$). For present purposes, we require this ratio to be between 2 and 4:1, preferably 2.5–3.5:1. It has been found that lenses embodying these ratios, that have a color purity of 60–75%, and a dominant wavelength of 580–605 nm provide good protection to a person experiencing a high sensitivity to strong sunlight. At the same time, an improved cosmetic effect, and more natural color perception, are obtained.

Figure 2:
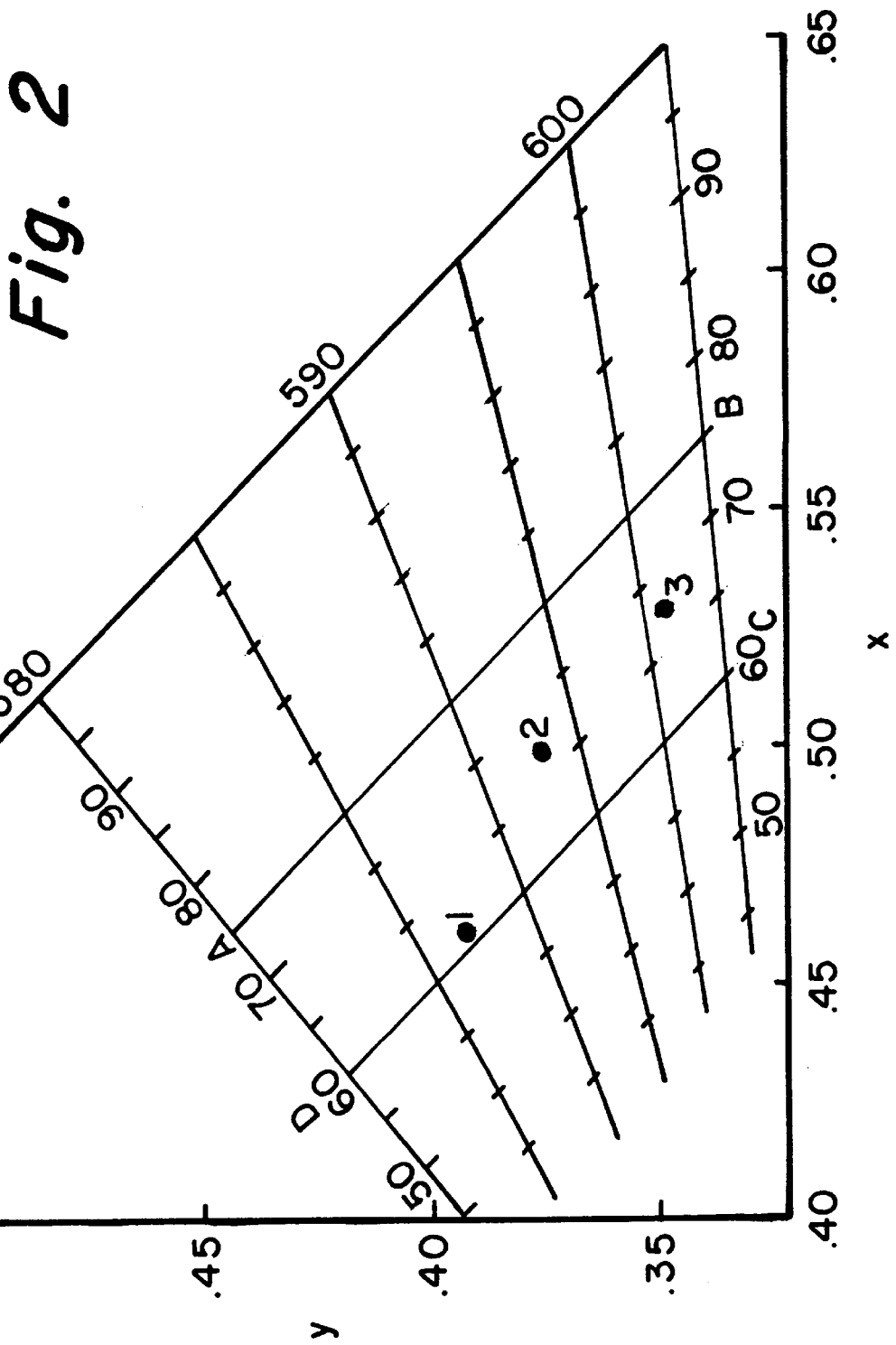
FIG. 2 is a color mixture diagram showing the chromaticity loci of examples and the characteristic limits of the present invention.

FIG. 2 in the accompanying drawing is a color mixture diagram showing characteristic limits of the present invention. x coordinates are plotted along the horizontal axis, and y coordinates are plotted along the vertical axis. Data were calculated using Illuminant C and the 1931 CIE Standard Observer. Dominant wavelength lines between 580 and 605 nm are indicated at 5 nm intervals. Spectral purity limits between 60 and 75% are shown at 5% spacings. The area within which the invention is operative is defined by polygon ABCD.

The present filter material also provides significant advantages from a production standpoint. The medical protective lenses based on the -686 patent have required lengthy firing times of 20–44 hours at about 400° C. in practice. Such long firing times were necessary to obtain adequate filtration of the actinic radiation to which users were sensitive. Necessarily, then, the reduced surface absorbs the actinic radiation to such an extent that the photochromic potential of the glass is not sufficiently activated in sunlight. It has been found necessary to front-side the lens, that is, remove the reduced front surface of a fired lens to permit entry of radiation to activate the photochromic potential of the glass. The front-siding is, of course, expensive and time consuming. Also, where all of the ultimate absorbing effect must occur in one surface, the back surface, considerably longer firing time is required.

The present lens permits passage of sufficient actinic radiation through the front surface to activate photochromic behavior in the glass. This eliminates the need for front-siding on plano, progressive and single vision lenses.

Because of the different photochromic behavior of the segment and crown glasses in a multi-focal lens, it is still deemed necessary to front-side such lenses. However, this is offset to an increasing degree by the movement to progressive lenses. For the first time, this type of lens can be effectively treated to impart the desired filter effect. Heretofore, the necessary front-siding of the lens ruined the progressive effect. Eliminating the need for front-siding the present lens now permits use of progressive lenses, thus greatly expanding the scope of applying the invention.

In producing the present lens, the time-temperature cycle must be quite closely controlled. In general, a monofocal lens will be fired under reducing conditions equivalent to firing in hydrogen for 30 minutes to 3 hours at 430–400° C. We prefer firing for about 90 minutes at about 415° C. Longer times up to 5 hours may be required when firing a multi-focal lens at low temperature.

The present lens requires a permanently tinted photochromic glass, as well as a carefully controlled firing schedule. The glasses are preferably permanently tinted with the addition of 0.1–1.0% cobalt and nickel oxides to the glass composition in accordance with disclosure in U.S. Pat. No. 4,358,542 (Hares et al.) and U.S. Pat. No. 4,390,635 (Morgan). The teachings of these patents are incorporated herein in their entirety by reference.

In development of our lens, we have used a glass designated by Corning Code 8135. That glass has the following composition:

| | | | |
|---|---|---|---|
| SiO$_2$ | 56.4 | ZrO$_2$ | 5.0 |
| B$_2$O$_3$ | 18.1 | Ag | 0.24 |
| Al$_2$O$_3$ | 6.2 | CuO | 0.0057 |
| Li$_2$O | 1.8 | Cl | 0.215 |
| Na$_2$O | 4.1 | Br | 0.16 |
| K$_2$O | 5.7 | CoO | 0.082 |
| TiO$_2$ | 1.9 | NiO | 0.144 |

The invention has been described with respect to photochromic glass, ophthalmic, filter lenses. These are preferred embodiments because of the ability to produce products with uniform and tightly controlled properties. However, as indicated earlier, the invention may also be practiced employing tintable plastic materials. Such applications include crash helmet visors and lightweight plastic lenses.

We have found that the unique features of our inventive filter can be extended by appropriate tinting of a polycarbonate optical plastic. It is well known that for coloring purposes, polycarbonate materials are supplied with a UV-cured, tintable coating to absorb a tinting dye.

EXAMPLES

Plano lenses having nominal 2 mm-thickness were prepared from pressed blanks of photochromic glasses having this composition. Lens samples were heat treated in a flowing hydrogen atmosphere in a matrix experiment incorporating several levels of temperature and time. The lenses were evaluated by a panel of observers who identified three examples as preferred. Processing and performance parameters for these examples are given in TABLE II below. Transmittance values shown were measured with the glass in its faded state.

TABLE II

| Example | Temp. | Time | $Y_P$ | $Y_S$ | $Y_P$:$Y_S$ |
|---|---|---|---|---|---|
| 1 | 425° C. | 45 min. | 23.4 | 9.9 | 2.4 |
| 2 | 414 | 90 | 17.8 | 6.2 | 2.9 |
| 3 | 405 | 150 | 12.4 | 3.7 | 3.4 |

Example 1 has a pleasing yellow-brown appearance. The scene colors were judged to be quite natural when viewed through this lens. The transmittance values are larger than desired for the intended glare-sensitive user population.

Example 2 has a pleasing mahogany appearance. The scene colors were judged to be natural and "warm" when viewed through this lens. The photopic and scotopic transmittance values are in the preferred range.

Example 3 has a dark red appearance. The scene colors have a purplish cast. The transmittance values of this lens are lower than desired.

The three lens examples are plotted in FIG. 2. The points are identified by example numbers. Example 2 represents the best mode of the invention. The preferred ranges are 60–75% color purity and a dominant wavelength of 590–595 nm.

Figure 3:
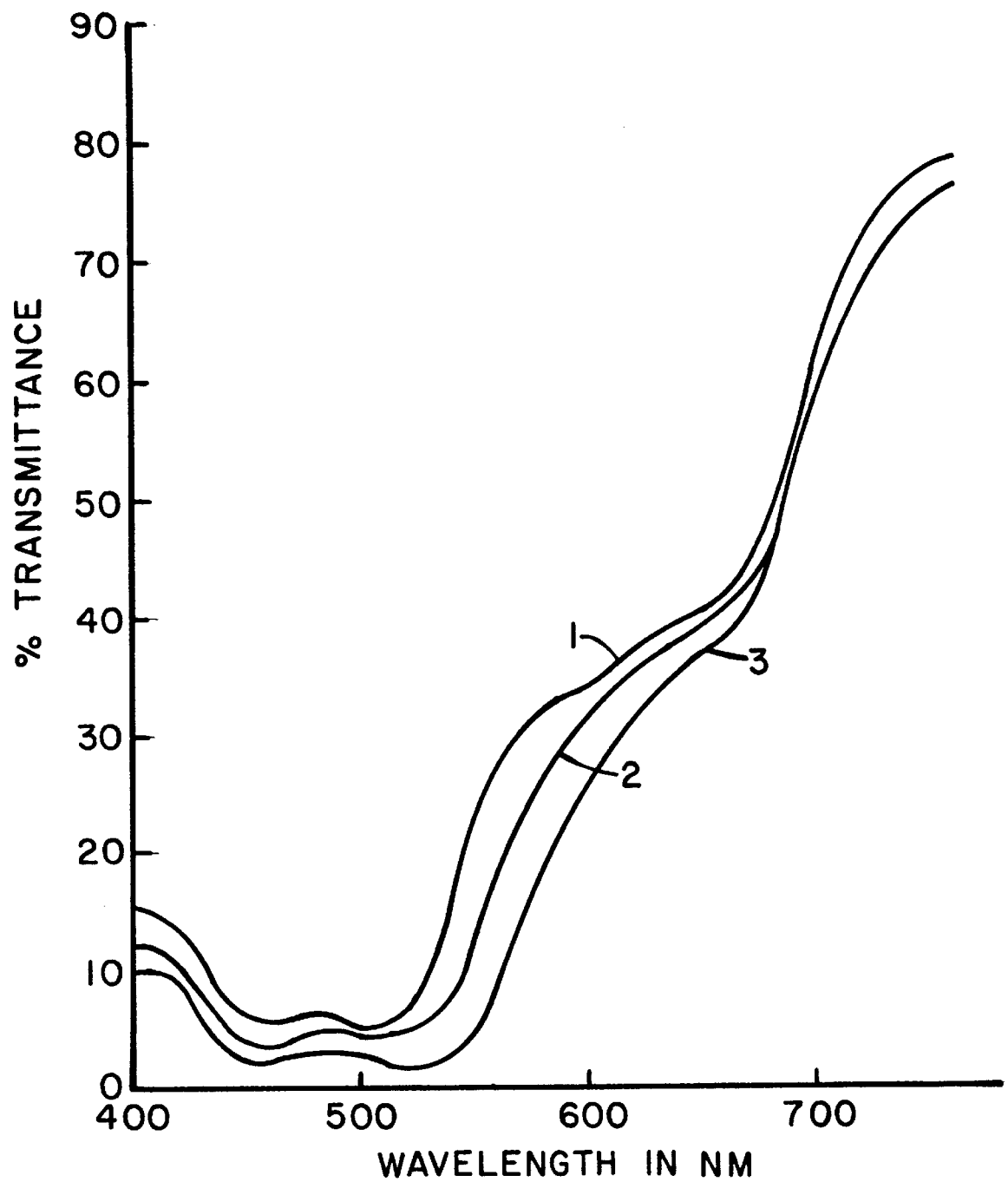
FIG. 3 is a graphical representation of the spectral transmittance values for exemplary lenses.

FIG. 3 is a graphical representation of spectral transmittance values. Wavelengths, in nm, are plotted along the horizontal axis; transmittance values, in %, are plotted along the vertical axis. Curves for the three exemplary lenses in the faded state are shown in FIG. 3. The numerical indicia on the curves correspond to those on the examples in TABLE II.

Practice of the invention is further described with respect to plastic filter materials that have been produced in accordance with the invention.

Tinting solutions were produced employing three dyes provided by SeeGreen Company of Bellingham, Wash. The dyes were identified by color as: (1) Sahara Brown, (2) Yellow and (3) Pink. As illustrated later, we were able to use the Sahara Brown dye to produce tinted plastic bodies having the definitive characteristics of the present invention. The Yellow and Pink dyes were not effective alone. However, they can be used in mixture with the brown dye to produce modified tints falling within the color box ABCD of FIGS. 2 and 4.

The dyes were prepared for use by mixing with deionized water employing the recommended recipe of one part dye to seven parts water. The dye solution was heated in a borosilicate glass vessel to a temperature approximating 99° C. on a hot-plate while being magnetically stirred.

Test pieces were cut from polycarbonate ophthalmic lenses. These lenses had a scratch-resistant UV cured, tintable coating applied over the lens. This was a commercially available coating obtained from UltraOptic, 6820 Shingle Creek Parkway, Brooklyn Center, Minn., 55490 under the designation UV/X scratch-resistant, tintable coating for use in a UOG mini-coating system.

Each test piece was immersed in a dye solution for a predetermined time. The spectral transmittance was measured on each sample. From these values, tristimulus values and chromaticity coordinates were calculated using a weighted ordinate method, with the 1931 CIE Standard Observer and Illuminant C. Data for the Brown series are tabulated in TABLE III giving the luminous (photopic) transmittance, $Y_P$ value, and the chromaticity coordinates (x, y).

TABLE III

| Time in Solution | $Y_P$ | x | y |
|---|---|---|---|
| 1 min. | 40.7 | .3825 | .3544 |
| 2 min. | 28.2 | .4140 | .3646 |
| 3 min. | 24.2 | .4281 | .3691 |
| 5 min. | 15.3 | .4644 | .3710 |
| 8 min. | 12.5 | .4803 | .3717 |
| 12 min. | 9.1 | .5027 | .3743 |

Figure 4:
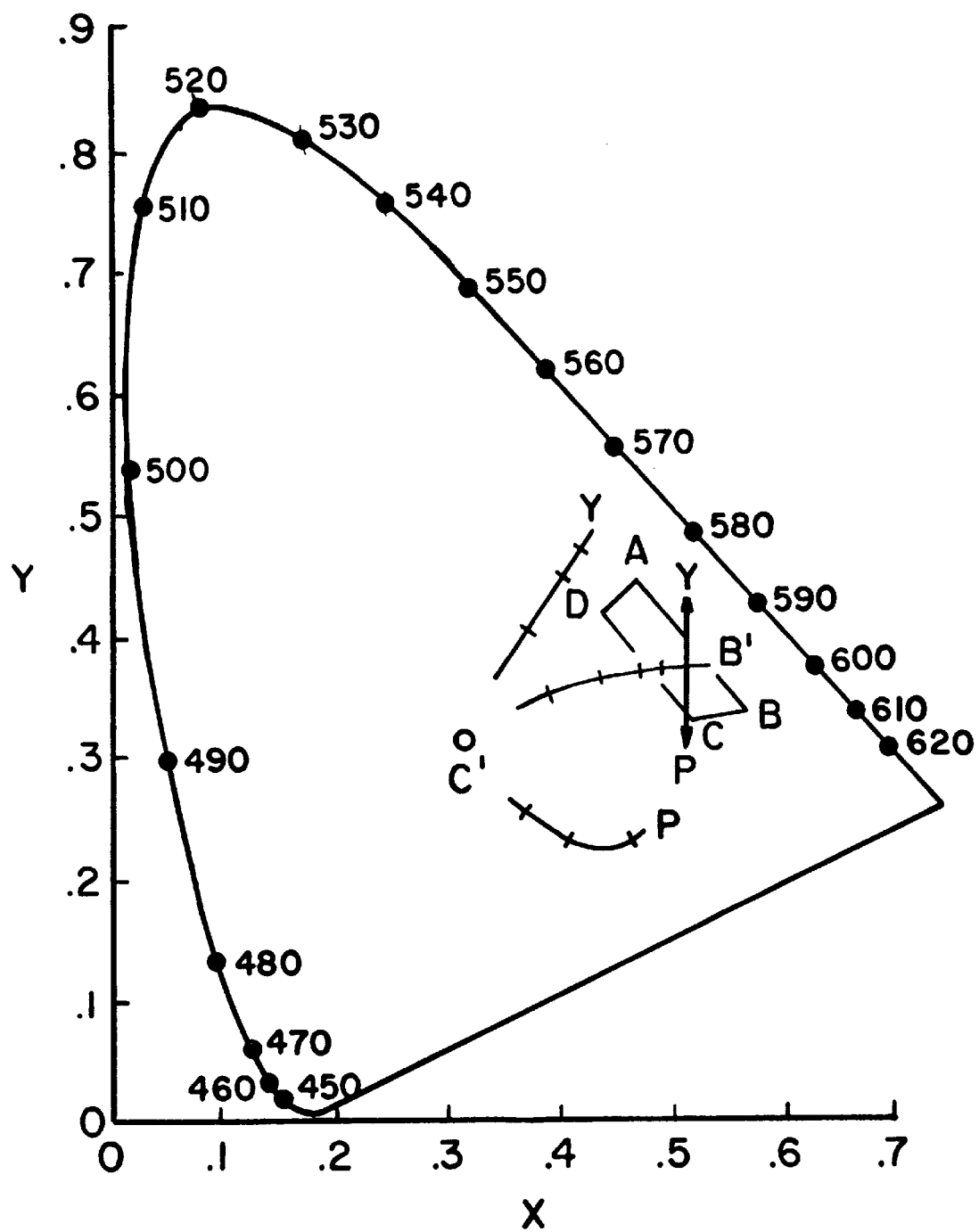
FIG. 4 is a color mixture diagram similar to FIG. 2, but illustrating application of the invention in a plastic material.

FIG. 4 is a color mixture diagram, similar to that shown in FIG. 2. Thus, in FIG. 4, as in FIG. 2, x coordinates are plotted on the horizontal axis and y coordinates on the vertical axis. The color box ABCD of FIG. 2 is transferred to FIG. 4.

The data shown in TABLE III for the test pieces impregnated with the brown dye are plotted in FIG. 4. The plotted points provide a chromaticity trajectory identified by $B^1$. It will be observed that measurements on the test pieces soaked for eight and twelve minutes in the brown dye fall within the color box (ABCD) that defines the present invention. As would be expected, longer soak times produce more saturated colors and lower luminous transmittances.

FIG. 4 also shows chromaticity trajectories based on test pieces soaked for different times in the yellow and pink dye solutions. The trajectory for the yellow dye samples is designated Y, and the trajectory for the pink dye pieces is designated by P. It will be observed that these trajectories are substantially outside the color box ABCD. While these dyes are not useful by themselves, as will be shown below, they are useful when mixed in a solution with the brown dye.

It is well known that opponent primary color pairs are blue/yellow and red/green. That is, to make a color more yellow, one reduces the intensity of the transmitted (or reflected) light in the blue portion of the visible spectrum. Similarly, for the other colors named, a green color is enhanced by reducing the intensity of the transmitted, or reflected, light in the red portion of the spectrum.

It has been found that samples impregnated with the brown dye have relatively flat absorption at wavelengths shorter than 520 nm., that the test pieces dyed in the yellow solution have a strong absorption below 460 nm., and that the pink dyed test pieces have strong absorption between 460–570 nm. By mixing either the pink or the yellow dye with the brown dye in suitable proportions, the dominant wavelength can be shifted to longer or shorter values, respectively. The spectral purity is determined, as before, by the time of the immersion in the dye mixture. In this manner, the hue of a color within the box ABCD can be shifted to either the right or left of the basic brown dye color.

To illustrate the effect of mixing dyes, mixtures were prepared by adding measured amounts of yellow dye and of pink dye, separately, to brown dye solution. The limit solution of brown and yellow dyes contained brown dye, yellow dye and water in a 3:1:21 proportions by volume. Likewise, the limit solution of brown and pink dyes in water was in 2:1:21 proportions by volume. The solutions were stirred and heated, and test pieces were prepared, as described above. The test pieces were all soaked on a twelve minute schedule, dried and measured.

TABLE IV shows the measured x and y coordinates and $Y_P$ values for the limit samples, as well as the corresponding values for the twelve minute brown dye test piece from TABLE III.

TABLE IV

| Solution | x | y | $Y_P$ |
|---|---|---|---|
| Brown | 0.5027 | 0.3743 | 9.1 |
| 3 Brown:1 Yellow | 0.5046 | 0.3973 | 12.1 |
| 2 Brown:1 Pink | 0.5039 | 0.3619 | 9.7 |

Data for the three mixtures, as shown in TABLE IV, were plotted in FIG. 4. A line, ending in arrows, is drawn through the plotted points to indicate the general trajectory of chromaticity coordinates obtainable with additions of either a yellow dye, or a pink dye, to a brown dye solution, and employing a twelve minute soak.

It is evident from FIG. 4 that, using the indicated materials, one would add more yellow dye to the brown-yellow solution, and shorten the soak time to obtain a shorter dominant wavelength within the chromaticity box ABCD. Thus, a five or eight minute soak in a solution containing more yellow dye should be effective. Likewise, with a brown dye solution containing additional pink dye, and using longer soak time, e.g., fifteen minutes, a longer dominant wavelength would be obtainable.

It will be recognized that, if dyes from different sources are employed, different results may be expected. Accordingly, some experimentation will be necessary to achieve the limits that define the present invention by dyeing plastic materials. It will also be appreciated that thermally curable coatings are available. These are generally not preferred since curing requires a significantly longer time in terms of hours.

Alternatively, the dominant wavelength can be moved by dipping a brown-dyed article briefly in a yellow or a pink dye solution. This technique is less desirable because there is a strong tendency for the brown dye to migrate out of the pores when dipped in another dye solution. Thus, it is preferable to use a mixed dye solution for changing the color hue.

We claim:

1. An ophthalmic filter material having a photopic transmittance ($Y_P$) higher than the scotopic transmittance ($Y_S$), the ratio of $Y_P:Y_S$ being in the range of 2.0–4.0, a dominant wavelength within the range of 580–605 nm and a color purity of 60–75%, whereby visible light is transmitted with minimal distortion of color.

2. An ophthalmic filter material in accordance with claim 1 wherein the material is a photochromic glass.

3. An ophthalmic filter material in accordance with claim 1 wherein the material is a tintable plastic.

4. An ophthalmic filter material in accordance with claim 1 wherein the filter material is in the form of an ophthalmic lens.

5. An ophthalmic filter material in accordance with claim 1 wherein the ratio of $Y_P:Y_S$ is in the range of 2.5–3.5:1.

6. An ophthalmic filter material in accordance with claim 1 wherein the filter material is in the form of a progressive lens.

7. An ophthalmic filter material in accordance with claim 1 wherein the material is a photochromic glass, the composition of which, as calculated in weight % on an oxide basis, consists essentially of

| | | | |
|---|---|---|---|
| $SiO_2$ | 20–65 | $ZrO_2$ | 0–6 |
| $B_2O_3$ | 14–23 | $TiO_2$ | 0–3 |
| $Al_2O_3$ | 5–25 | PbO | 0–0.5 |
| $P_2O_5$ | 0–25 | BaO | 0–7 |
| $Li_2O$ | 0–2.5 | CaO | 0–4 |
| $Na_2O$ | 0–9 | MgO | 0–3 |
| $K_2O$ | 0–17 | $Nb_2O_5$ | 0–6 |
| $Li_2O + Na_2O + K_2O$ | 8–20 | $La_2O_3$ | 0–4 |
| | | F | 0–2 | plus 0–1% transition metal oxides and 0–5% rare earth metal oxides as colorants and, as photochromic additives, 0.15–0.3% Ag, 0.1–0.25% Cl, 0.1–0.2% Br and 0.004–0.02% CuO.

8. An ophthalmic filter material in accordance with claim 7 wherein the glass composition contains 0.1–1.0% CoO+NiO to impart a permanent tint to the glass.

9. An ophthalmic filter material in accordance with claim 1 wherein the material is a polycarbonate plastic having a surface layer of a tintable, UV-cured coating.

10. A method of producing the filter material of claim 1 which comprises heating a photochromic glass under reducing conditions for a time and at a temperature that is sufficient to impart the recited characteristics to the glass surface, the reducing conditions being equivalent to hydrogen flowing over the glass surface.

11. A method in accordance with claim 10 wherein the glass is heated under reducing conditions for a time that is equivalent to heating the glass for 30 minutes to 5 hours in flowing hydrogen.

12. A method in accordance with claim 10 wherein the glass is heated to a temperature of 400°–430° C.

13. A method in accordance with claim 10 wherein the filter material is heated in a flowing hydrogen atmosphere on a time-temperature cycle ranging from 30 minutes at 430° C. to 3 hours at 400° C.

14. A method in accordance with claim 13 wherein the time-temperature cycle is 90 minutes at 415° C.

15. A method of producing the filter material of claim 1 which comprises immersing a tintable plastic article in a dye solution for a time that is sufficient to impart the recited characteristics to the article surface.

16. A method in accordance with claim 15 which comprises immersing a polycarbonate plastic article having a tintable coating over its surface.

17. A method in accordance with claim 15 which comprises immersing the plastic article in a solution predominantly composed of a brown dye for a period of at least eight minutes.

* * * * *